UNITED STATES PATENT OFFICE.

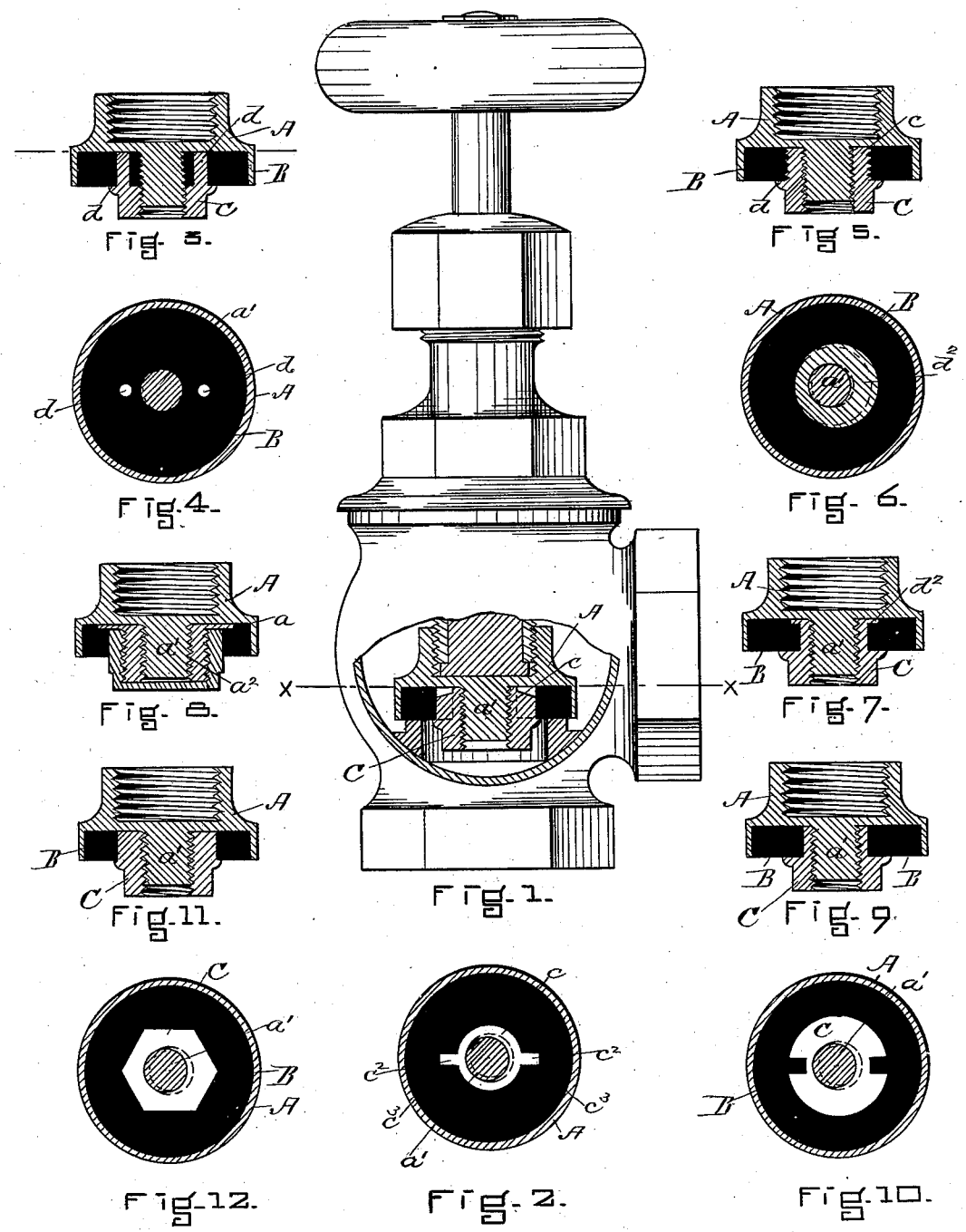

CHARLES JENKINS, OF BOSTON, MASSACHUSETTS.

VALVE.

SPECIFICATION forming part of Letters Patent No. 362,630, dated May 10, 1887.

Application filed September 13, 1886. Serial No. 213,381. (No model.)

*To all whom it may concern:*

Be it known that I, CHARLES JENKINS, of Boston, in the county of Suffolk and State of Massachusetts, a citizen of the United States, have invented a new and useful Improvement in Valves, of which the following is a full, clear, and exact description, reference being had to the accompanying drawings, forming a part of this specification, in explaining its nature.

The invention relates to the class of valves known as the "Jenkins Valve," or that class employing a removable disk or ring of packing or other material as a valve-seat; and it relates especially to the attachment of the packing to a holding-nut, or to its connection therewith in such a manner that the turning of the nut to remove a disk or ring of worn or other packing from its holder shall also cause the loosening of the disk or ring in its holder, and so that it can be readily removed therefrom when the nut has been unscrewed.

Heretofore in valves of this character the packing has been made in the form of a disk, and has been secured to the valve-head, or in a recess in the valve-head, by a stud which passes through the hole in the disk and a nut which screws upon the end of the stud and laps upon the outer surface of the disk.

In use the disk is subjected to pressure and to other influences which cause its side edges to adhere to the walls of the recess, and, consequently, upon the removal of the holding-nut the packing cannot readily be removed from its holding-recess. To overcome this difficulty, I connect the disk or ring of packing with the holding-nut, so that upon the turning thereof to remove it from the stud or spindle the ring or disk of packing is also caused to be loosened or turned in its holding-recess, so as to become disengaged from the wall thereof and drop from its holding-cavity upon the removal of the holding-nut from the stud.

Referring to the drawings, Figure 1 is a view in elevation of a valve having the features of my invention, part of the casing being broken out to show the valve head and seat and method of securing the packing to the head. Fig. 2 is a view in section of the valve-head upon the line $xx$ of Fig. 1. Figs. 3 to 12, inclusive, illustrate by section various other forms of attaching the packing to its holding-nut which I consider the equivalent of the one shown in Figs. 1 and 2, and which will be hereinafter more fully described.

A represents the valve-head, or that part thereof which holds or carries the packing. It has a packing-holding recess, $a$, and a stud, $a'$, having the screw-thread $a^2$.

B is a ring or disk of packing.

C is the holding-nut which screws upon the screw-thread of a stud, and serves to fasten the packing in the recess. The nut laps upon the outer surface of the packing, as shown in Fig. 3. The ring or disk of packing may be attached or secured to the holding-nut in a number of ways, which are equivalents each of the other, and I have illustrated some of these ways in the drawings.

In Figs. 1 and 2 I have represented the nut as having the sleeve $c$ extending from the head $c'$, provided with lugs or extensions $c^2$, which enter recesses $c^3$, formed in the packing for their reception.

In Figs. 9 and 10 I have shown the recesses formed in the sleeve or extension of the nut, and the packing as having extensions entering these recesses.

In Figs. 3 and 4 I have shown the packing secured to the head of the nut by pins $d$, which pass from the head into the packing.

In Figs. 5 and 6 I have shown the screw-sleeve $c$ of the nut C as provided with a screw-thread, $d'$, the reverse in pitch of the screw-thread by which the nut is attached to the stud.

In Fig. 7 I have represented the inner end, $d^2$, of the screw-sleeve $c$ as upset, to provide a flange or extension to shut upon the inner surface of the disk.

In Fig. 8 I have shown a separate screw-sleeve, which screws into the outer section or head of the nut, and having a flange which extends or laps upon the inner surface or end of the packing.

In Fig. 12 I have represented the sleeve $c$ as being made hexagonal instead of circular, and the packing of course will then have a hexagonal hole to fit the sleeve. Of course, the sleeve may be square or of any other form to accomplish the same purpose. I do not, however, confine myself to these especial ways of attaching the disk or ring to the nut.

I prefer to use a nut having the sleeve extending into the recess over the stud, so that its outer surface shall form one wall of the packing-recess, as this decreases the area of the recess against which the packing shall adhere or become attached, and it also furnishes a continuous support for the lugs or other devices for attaching or connecting the packing with the nut. When, however, the construction shown in Figs. 3 and 4, employing pins or studs extending from the nut into the packing, is used, it is not so essential to extend the sleeve from the head of the nut. This manner of attaching or securing the packing to the nut not only serves to afford a means by which the worn-out or imperfect packing may be readily removed, but it also serves to lock or hold the packing-holding nut tightly in place upon the stud, and it is of very considerable advantage, as in the old construction the nuts very often worked loose and permitted the disk or packing to become loose or detached, or to play in its recess.

In use the disk or ring of packing is placed upon the sleeve of the holding-nut and the holding-nut placed upon the stud and turned until the packing has entered the recess and is firmly locked therein. To remove the packing it is necessary to unscrew the nut. The turning of the nut in unscrewing causes the packing to be detached from the wall of its holding-recess, so that it will drop therefrom upon the entire removal of the nut from the stud.

Having thus fully described my invention, I claim and desire to secure by Letters Patent of the United States—

1. In a valve, a disk or ring of packing and its holding nut or device connected with each other, the disk or ring of packing extending beyond the edge of the nut or holding device, all as and for the purposes described.

2. The combination, in a valve, of a valve-head having a packing-holding recess and a screw-stud, with a disk or ring of packing and a holding-nut connected with said packing, whereby upon the unscrewing of the nut the packing is caused to be turned in its holding-recess and detached from the wall thereof, substantially as described.

3. The combination of the valve-head having a recess, $a$, with the stud $a'$, packing B, and nut C, having the sleeve $c$ connected with the packing, substantially as described.

CHARLES JENKINS.

Witnesses:
  F. F. RAYMOND, 2d,
  FRED. B. DOLAN.